United States Patent
Dighe et al.

(10) Patent No.: US 10,450,213 B2
(45) Date of Patent: Oct. 22, 2019

(54) PRODUCTION OF HEAVY BRINES BY CALCINATION OF CARBONATES USING PLASMA ARC REACTOR

(71) Applicant: Aquasource Technologies Corporation, North Huntingdon, PA (US)

(72) Inventors: Shyam Vasant Dighe, North Huntingdon, PA (US); Jong Min Lee, New York, NY (US)

(73) Assignee: Aquasource Technologies Corporation, North Huntingdon, PA (US)

( * ) Notice: Subject to any disclaimer, the term of this patent is extended or adjusted under 35 U.S.C. 154(b) by 0 days.

(21) Appl. No.: 16/012,879

(22) Filed: Jun. 20, 2018

(65) Prior Publication Data

US 2018/0362378 A1 Dec. 20, 2018

Related U.S. Application Data

(60) Provisional application No. 62/522,309, filed on Jun. 20, 2017.

(51) Int. Cl.
*C02F 9/00* (2006.01)
*C01F 5/06* (2006.01)
(Continued)

(52) U.S. Cl.
CPC .............. *C02F 9/00* (2013.01); *B01D 1/0017* (2013.01); *B01D 3/007* (2013.01); *B01D 3/148* (2013.01); *B01D 5/0003* (2013.01); *B01D 5/006* (2013.01); *B01D 5/0054* (2013.01); *B01D 9/0018* (2013.01); *B01D 9/0031* (2013.01); *B01D 9/0059* (2013.01); *C01B 9/02* (2013.01); *C01F 5/02* (2013.01); *C01F 5/06* (2013.01); *C01F 5/30* (2013.01); *C01F 11/02* (2013.01); *C01F 11/06* (2013.01); *C01F 11/28* (2013.01); *C02F 1/048* (2013.01); *B01D 2009/0086* (2013.01);
(Continued)

(58) Field of Classification Search
CPC ... B01D 1/00; B01D 5/00; B01D 3/14; B01D 9/00; C02F 9/00; C01F 5/30
See application file for complete search history.

(56) References Cited

U.S. PATENT DOCUMENTS 3,966,541 A 6/1976 Sadan
5,407,576 A 4/1995 Wolf et al.
(Continued)

FOREIGN PATENT DOCUMENTS

EP 0 261 477 A1 9/1987

OTHER PUBLICATIONS

Notification of Transmittal of the International Search Report and the Written Opinion of the International Searching Authority, International Search Report and Written Opinion of the International Searching Authority for PCT/US2018/038419, dated Sep. 7, 2018 (10 pages).

*Primary Examiner* — Brian A McCaig
(74) *Attorney, Agent, or Firm* — Buchanan Ingersoll & Rooney PC (57) ABSTRACT

Embodiments relate to systems and methods directed towards arrangements of a preheater, a heat exchanger, a plasma recovery system, and at least one processing stage configured to use steam output of a calciner for heating incoming wastewater that is being processed.

14 Claims, 5 Drawing Sheets

(51) Int. Cl.

| | | |
|---|---|---|
| *C01F 11/06* | (2006.01) | |
| *C01B 9/02* | (2006.01) | |
| *B01D 3/00* | (2006.01) | |
| *B01D 9/00* | (2006.01) | |
| *B01D 5/00* | (2006.01) | |
| *B01D 3/14* | (2006.01) | |
| *C01F 5/30* | (2006.01) | |
| *C01F 11/28* | (2006.01) | |
| *C01F 11/02* | (2006.01) | |
| *C01F 5/02* | (2006.01) | |
| *C02F 1/04* | (2006.01) | |
| *B01D 1/00* | (2006.01) | |
| *C02F 1/52* | (2006.01) | |
| *C02F 1/06* | (2006.01) | |
| *C02F 1/30* | (2006.01) | |
| *C02F 103/10* | (2006.01) | |
| *C02F 101/32* | (2006.01) | |
| *C02F 1/20* | (2006.01) | |

(52) U.S. Cl.
CPC ...... *C02F 1/06* (2013.01); *C02F 1/20* (2013.01); *C02F 1/30* (2013.01); *C02F 1/5236* (2013.01); *C02F 1/5281* (2013.01); *C02F 2001/5218* (2013.01); *C02F 2101/322* (2013.01); *C02F 2103/10* (2013.01); *C02F 2301/08* (2013.01)

(56) References Cited

U.S. PATENT DOCUMENTS

| | | |
|---|---|---|
| 7,077,878 B1 | 7/2006 | Muhlen et al. |
| 2013/0062188 A1* | 3/2013 | Dighe ............ C02F 1/06 203/11 |
| 2015/0275330 A1 | 10/2015 | Boudreault et al. |

* cited by examiner

PRODUCTION OF HEAVY BRINES BY CALCINATION OF CARBONATES USING PLASMA ARC REACTOR

FIELD OF THE INVENTION

The present invention relates generally to treatment of water including examples of ways for treating water containing large amounts of dissolved solids as may result from use of the water as a fracking fluid used in drilling gas wells.

BACKGROUND OF THE INVENTION

Economical drilling for shale gas requires reuse of flowback and produced waters. The flowback water is generally used for initial fracking purposes of wells while the produced water when adequately prepared to required specification of total dissolved solids, density, etc. can be used for well closures and well turnovers. Such produced waters are called heavy brines.

Conventional techniques for preparing heavy brines involve treatment of produced waters by using thermal evaporation equipment. However, some current activities show those techniques to have limited cost effectiveness.

The present invention is directed towards overcoming one or more of the above-identified problems.

SUMMARY OF THE INVENTION

The present invention can take numerous forms among which are those in which wastewater containing a large amount of solids, including dissolved salts, is pressurized to allow considerable heat to be applied before the water evaporates, and is then subjected to separation and recovery apparatus to recover relatively waters with concentrated levels of dissolved solids. Above a certain range of concentration of dissolved solids, i.e., densities in the range of 10.0-11.5, the waters are called heavy brines. In cases where it is desirable to increase the density of heavy brines, the concentrated waters may be supplied to a thermal, pyrolytic, reactor (or crystallizer/calciner) to evaporate water and simultaneously produce high quality steam which is used in preheating steps and concentration steps. For cases, wherein the solubility of certain salts, limit the rise in density of the heavy brine by evaporation of water alone, then such concentrated waters may be supplied to a thermal, pyrolytic, reactor (or calciner) along with the co-feeding of carbonate(s) of typically divalent cations, e.g., calcium carbonate, magnesium carbonate, etc. for transforming them into heavy brines with higher densities. The divalent cations form soluble chlorides by the reaction of oxides formed during the calcining process and thereby add to the density of the heavy brine.

Particular apparatus for systems and processes in accordance with the present invention can be adapted from apparatus that is presently currently available, but which has not been previously applied in the same manner. Just as examples, conventional forms of flash evaporation equipment, such as are used for treating sea water, in one or in multiple stages, may be applied as separation and recovery apparatus. Likewise, conventional forms of gasification/vitrification reactors, such as are used for municipal solid waste (MSW) processing, including but not limited to plasma gasification/vitrification reactors, may be applied for calcination of divalent carbonates for transforming them into heavy brines with higher densities.

The present application presents examples of such systems and processes in which, in one or more stages, steam output of a calciner used to concentrate wastewaters is supplied to a preheater for incoming water to be treated. The systems and processes disclosed herein are configured to generate in-situ chlorides (e.g., Ca and/or Mg chlorides) from cheaper raw materials (e.g., carbonates of Ca and/or Mg).

In at least one embodiment, a system for treating wastewater includes a preheater configured to receive wastewater. The system includes a heat exchanger configured to receive wastewater from the preheater and supply steam to the preheater. The system includes a plasma recovery system (PRS) configured to receive wastewater from the heat exchanger and provide steam to the heat exchanger. The wastewater includes water, salt, and volatile organic compounds. The preheater transfers heat from the steam to the wastewater, converting the steam to distilled water. The heat exchanger transfers heat from the steam to the wastewater before transferring the steam to the preheater. The PRS is configured to: volatize water from the wastewater to generate steam; and separate salt from the wastewater to generate a brine. The system includes at least one processing stage configured to increase a concentration of the salt in the brine to form a concentrated brine. The system has at least one plasma crystallizer/calciner configured to receive the concentrated brine and separate water from the concentrated brine. The plasma crystallizer/calciner includes a pyrolytic calcining reactor configured to generate chlorides that mix with the concentrated brine. In some embodiments, system generates chlorides that are in-situ chlorides. The in-situ chlorides may be generated from carbonates. In some embodiments, the carbonates are $CaCO_3$ and/or $MgCO_3$ and the chlorides are $CaCl_2$ and/or $MgCl_2$.

In some embodiments, the at least one processing stage has a plurality of processing stages, the plurality of processing stages being a first processing stage, a second processing stage, and a third processing stage. The first processing stage has: a first stage pump, a first stage condenser, a first stage preheater, and a first stage evaporator, the first processing stage being configured to receive the brine and produce a first brine water. The brine is at an initial pressure, an initial temperature, and having an initial concentration of salt. The first brine water has a first pressure greater than the initial pressure, a first temperature greater than the initial temperature, and a first concentration of salt greater than the initial concentration of salt. The first stage evaporator is configured to generate steam from the brine and direct the steam to the first stage preheater. The second processing stage has: a second stage pump, a second stage condenser, a second stage preheater, and a second stage evaporator, the second processing stage being configured to receive the first brine water and produce a second brine water having a second pressure greater than the first pressure, a second temperature greater than the first temperature, and a second concentration of salt greater than the first concentration of salt. The second stage evaporator is configured to generate steam from the first brine water and direct the steam to the second stage preheater. The third processing stage has: a third stage pump, a third stage condenser, a third stage preheater, and a third stage evaporator, the third processing stage being configured to receive the second brine water and produce a third brine water having a third pressure greater than the second pressure, a third temperature greater than the second temperature, and a third concentration of salt greater than the second concentration of salt. The third stage evaporator is configured to generate steam from the second brine water and direct the steam to the third stage preheater.

In some embodiments, the at least one plasma crystallizer/calciner includes a first plasma crystallizer/calciner, a second plasma crystallizer/calciner, and a third plasma crystallizer/calciner. The first plasma crystallizer/calciner is configured to receive the first brine water and separate water from the first brine water, the second plasma crystallizer/calciner is configured to receive the second brine water and separate water from the second brine water, and the third plasma crystallizer/calciner is configured to receive the third brine water and separate water from the third brine water.

In some embodiments, the at least one plasma crystallizer/calciner includes a vitrifier. In some embodiments, the at least one plasma crystallizer/calciner is configured to generate excess steam and direct the excess steam to the at least one processing stage. In some embodiments, the first plasma crystallizer/calciner is configured to generate excess steam and direct the excess steam to the first processing stage, the second plasma crystallizer/calciner is configured to generate excess steam and direct the excess steam to the second processing stage, and the third plasma crystallizer/calciner is configured to generate excess steam and direct the excess steam to the third processing stage.

In some embodiments, the at least one plasma crystallizer/calciner is configured to generate excess steam and direct the excess steam to a condenser in operative connection with the plasma crystallizer/calciner, wherein the condenser is configured to convert the excess steam to distilled water.

Some embodiments include a stripper in operative connection with the at least one plasma crystallizer/calciner. The stripper is configured to remove the volatile organic compounds from the concentrated brine. The at least one plasma crystallizer/calciner is configured to generate excess steam and direct the excess steam to the stripper.

Some embodiments include a stripper in operative connection with the at least one plasma crystallizer/calciner and a condenser in operative connection with the at least one plasma crystallizer/calciner. The at least one plasma crystallizer/calciner is configured to generate excess steam and direct the excess steam to each of: the at least one processing stage; the stripper; and the condenser.

Some embodiments include a stripper in operative connection with the PRS, the stripper configured to remove the volatile organic compounds from the brine. In some embodiments, the stripper is configured to transfer the volatile organic compounds to a plasma crystallizer/calciner having a plasma torch. The plasma torch can convert the volatile organic compounds to heat.

In at least one embodiment, a system for treating wastewater includes a preheater configured to receive wastewater via a first conduit. The system includes a heat exchanger configured to receive wastewater from the preheater via a second conduit and supply steam to the preheater via a third conduit. The system includes a plasma recovery system (PRS) configured to receive wastewater from the heat exchanger via a fourth conduit and provide steam to the heat exchanger via a fifth conduit. The PRS is configured to: volatize water from the wastewater to generate steam; and separate salt from the wastewater to generate a brine. The system includes at least one processing stage in operative connection with the PRS, the at least one processing stage configured to increase a concentration of the salt in the brine to form a concentrated brine. The wastewater includes water, salt, and volatile organic compounds. The preheater transfers heat from the steam to the wastewater, converting the steam to distilled water that exists the preheater via a sixth conduit. The heat exchanger transfers heat from the steam to the wastewater before transferring the steam to the preheater. The PRS is configured to: volatize water from the wastewater to generate steam that exists the PRS via the fifth conduit; and separate salt from the wastewater to generate a brine that exists the PRS via a seventh conduit. The at least one processing stage includes: a processing stage pump, a processing stage condenser, a processing stage preheater, and a processing stage evaporator. The processing stage pump is configured to transfer the brine to the processing stage condenser. The processing stage condenser is configured to transfer the brine to the processing stage preheater. The processing stage preheater is configured to transfer the brine to the processing stage evaporator. The processing stage evaporator is configured to generate steam and transfer the steam to the processing stage preheater. The processing stage preheater transfers heat from the steam to the brine and transfers excess steam to the processing stage condenser. The processing stage condenser transfers heat from the steam to the brine. The brine exists the processing stage evaporator as the concentrated brine. The system includes a plasma crystallizer/calciner configured to receive the concentrated brine. The plasma crystallizer/calciner has a pyrolytic calcining reactor configured to generate in-situ chlorides that mix with the concentrated brine.

In some embodiments, the plasma crystallizer/calciner generates steam and transfers the steam to the processing stage preheater.

In at least one embodiment, a method for treating wastewater involves receiving wastewater at a preheater, the wastewater including water, salt, and volatile organic compounds. The method involves transferring the wastewater from the preheater to a heat exchanger. The method involves transferring steam from the heat exchanger to the preheater, the preheater transferring heat from the steam to the wastewater. The method involves transferring the wastewater from the heat exchanger to a plasma recovery system (PRS) to generate steam and a brine. The method involves transferring steam from the PRS to the heat exchanger, the heat exchanger transferring heat from the steam to the wastewater. The method involves transferring the wastewater from the PRS to at least one processing stage, increasing a concentration of salt in the brine to form a concentrated brine. The method involves transferring the concentrated brine to a pyrolytic calcining reactor, generating in-situ chlorides that mix with the concentrated brine.

In some embodiments, the at least one processing stage has a plurality of processing stages, the plurality of processing stages including a first processing stage, a second processing stage, and a third processing stage.

In some embodiments, the at least one processing stage has at least one of a first processing stage, a second processing stage, and a third processing stage. The brine is selectively directed to at least one of the first processing stage, the second processing stage, and the third processing stage.

In some embodiments, the brine within the first processing stage is a pressure within a range from 14.7 psia to 150 psia and at a temperature of 358° F., the brine within the second processing stage is at a pressure within a range from 5 psia to 150 psia and at a temperature of 358° F., the brine within the third processing stage is at a pressure within a range from 5 psia to 150 psia and at a temperature of 358° F.

Further explanations, objects and examples of various aspects of the present invention are presented in the following sections.

DETAILED DESCRIPTION OF THE INVENTION

Figure 1:
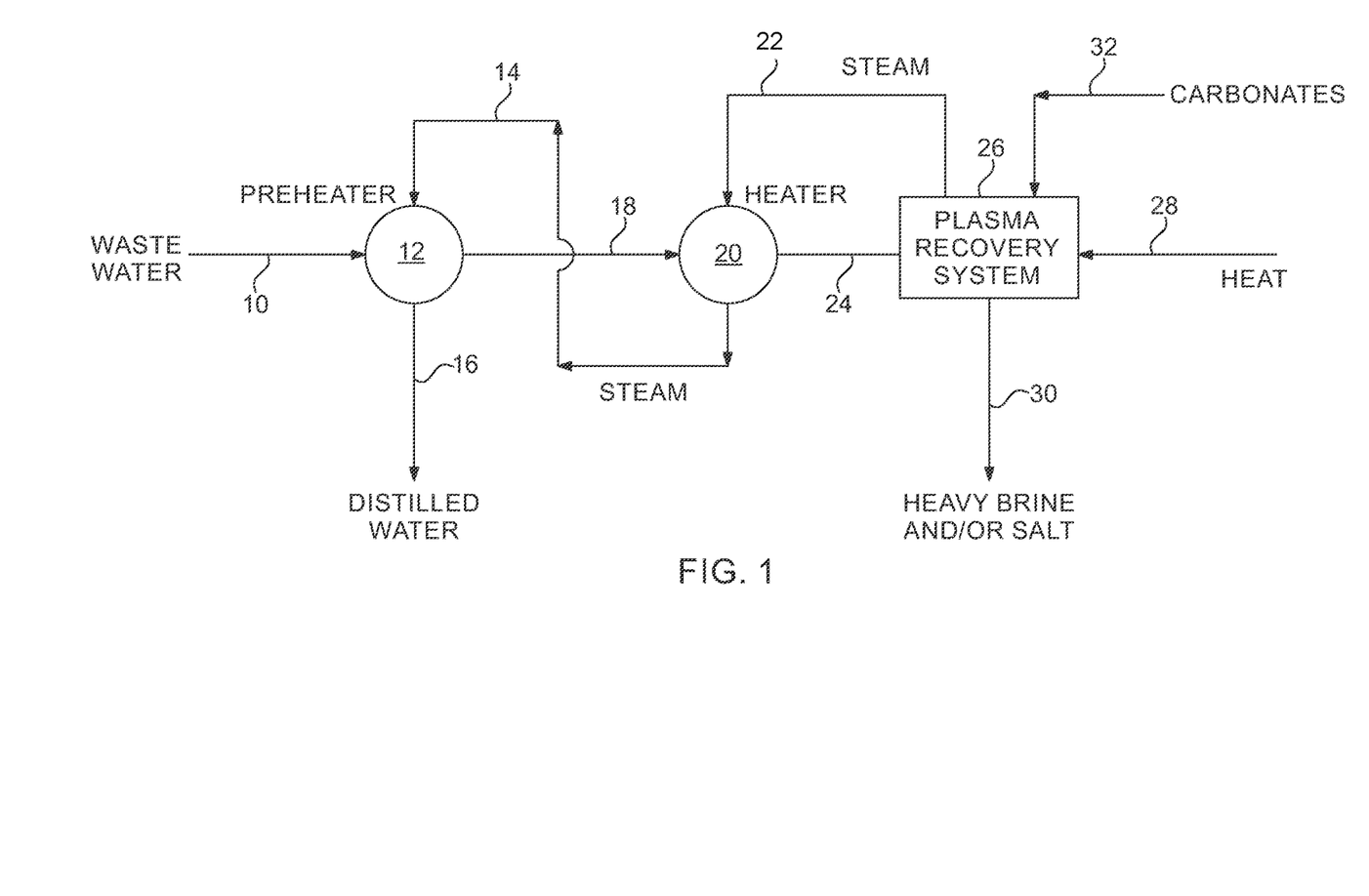
FIG. 1 is a generalized schematic view of an example system for water treatment.

Referring to FIG. 1, wastewater is supplied via a conduit 10 to a preheater 12 (e.g., a shell and tube heat exchanger) in which the initial wastewater is heated by steam that is supplied through a conduit 14 and exits the preheater 12 as distilled water in an outlet conduit 16. (Other examples presented below illustrate pressurization of the wastewater before it is heated, which offers advantages that will be described.)

The heated wastewater exits the preheater 12 by conduit 18 and is supplied to a further heater (or heat exchanger) 20. Heater 20 receives steam from a conduit 22 that exits via conduit 14 to the preheater 12.

The heated wastewater exits the heater 20 in a conduit 24 leading to a subsystem 26 here referred to as a Plasma Recovery System (or PRS). Examples of equipment for the PRS and their operation will be given subsequently. One principal function of the PRS is to utilize (or consume) heat represented as an input 28 that volatilizes water from the wastewater stream (and possibly some other water input) to form steam supplied to the heater 20 via conduit 22. Another function of the PRS is to separate out (or concentrate) salts of the wastewater that comes in via conduit 24 and produce salt product(s) at an output 30. Another function of the PRS is to concentrate salts of the wastewater that comes in via conduit 24 and calcine carbonates that comes in via conduit 32 and produce heavy brine(s) at an output 30.

The salt products of the PRS may be in the form of a solid mass or within a brine subjected to disposition or other treatment, or, as will be described, the PRS may include apparatus for vitrification of the salt products and/or production of heavy brines.

Figure 2:
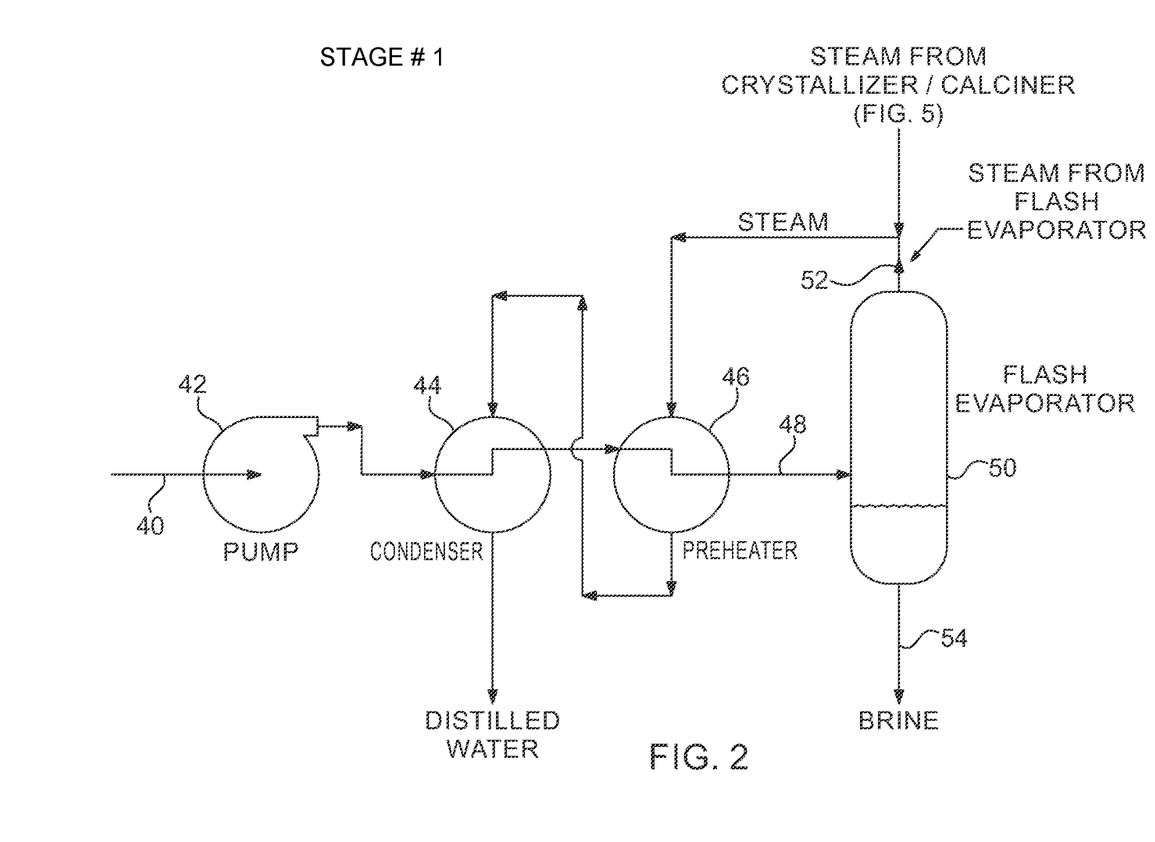
FIGS. 2, 3, and 4 are schematic flow diagrams of examples of stages of a treatment system.
Figure 3:
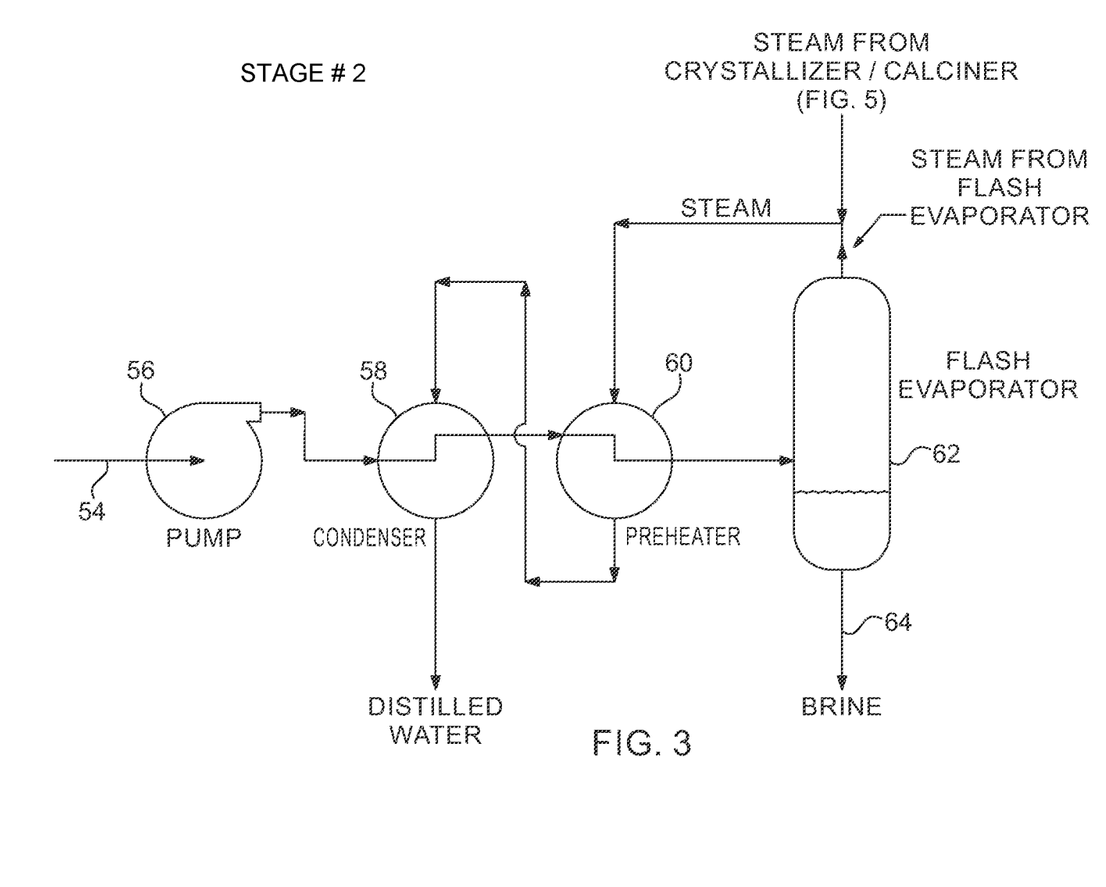
Figure 4:
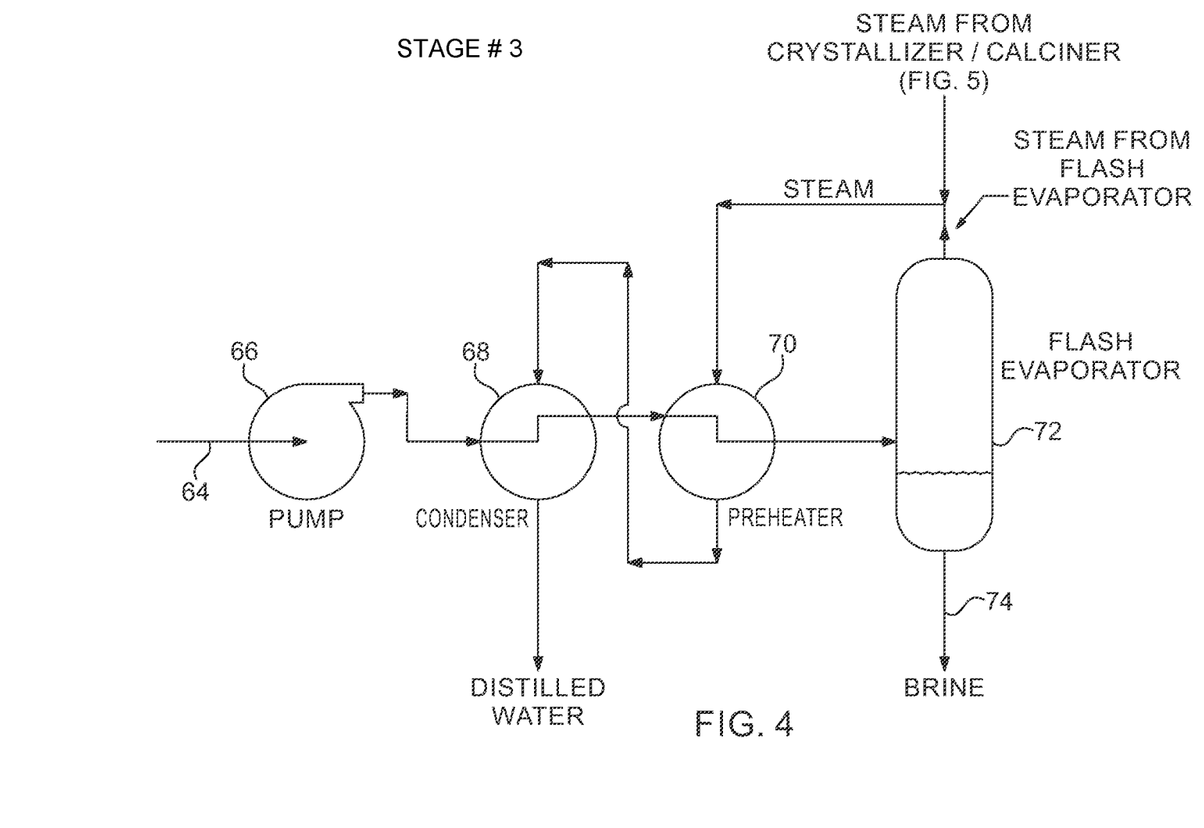

FIGS. 2, 3 and 4 will be individually discussed, but first their relation to each other in an example multi-stage system will be described. FIG. 2 shows Stage #1. This first stage takes in wastewater at an inlet 40, processes it and produces first stage brine water at an outlet 54 of the first stage. The first stage brine water from the outlet 54 is input to the second stage shown in FIG. 3 for additional processing and a resulting second stage brine water output at outlet 64. Similarly, the brine water from outlet 64 of the second stage is supplied as an input to the third stage shown in FIG. 4 that has additional processing resulting in a third stage output of brine water at an outlet 74.

It will be seen how the successive stages of FIGS. 2, 3, and 4 increase the concentration of salts in the brine water. It will also be appreciated how the number of stages is a variable that can be chosen according to factors including the salts content of the original wastewater and the desired salt content after concentration. In general, a system in accordance with these examples may include any one or more stages such as are shown in FIGS. 2-4. The examples being presented are illustrative of systems that may be chosen not merely for good technical performance but also for reasons relating to economic factors, such as initial capital cost and operating cost, as well as convenience factors, such as space requirements and portability.

Each of the FIGS. 2-5, merely by way of further example and without limitation, include legends that represent the nature and characteristics of materials as applied to, affected by, and resulting from the operations of the example system. Not all such legends will be repeated in this text although all form a part of this disclosure and are believed understandable to persons of ordinary skill in water treatment and thermal processes; such data are sometimes referred to as heat and material balances.

Referring to FIG. 2, which shows Stage #1, wastewater at the inlet 40 at lower pressures in the range of 1 atmosphere to 5 atmospheres and lower temperatures ranging from 40° F. to 100° F. with total dissolved solids (TDS) inlet concentration ranging from 1% to 30% is processed, in this stage, through a pump 42, condenser 44, and preheater 46 to a higher pressure ranging from 2 to 20 times the lower inlet pressure and higher temperatures ranging from 300° F. to 600° F. at an inlet 48 to a flash evaporator 50 which generates steam from the water (at outlet 52) applied to the preheater 46 and a brine water from another outlet 54 that has salts concentrated to outlet concentration of TDS greater than the inlet concentration. The pump 42 elevates the waste water pressure from approximately 14.7 psia (1 atm) to approximately 150 psia. The level of pressurization of waste water in all stages is such that there is no boiling of the waste water inside and across the heat exchanger surfaces of all heat exchangers used in this system. This is done to prevent formation of deposits (scales, fouling etc.) on the heat exchanger surfaces. The temperature is also raised so that the input waste water to the flash evaporator 50 is at 150 psia and 358° F.

FIG. 3 shows Stage #2. The second stage takes the output 54 of the first stage as its input and, similarly to processing in the first stage, that input is processed in the second stage that includes a pump 56, condenser 58, preheater 60 and flash evaporator 62. The resulting output of the second stage, at an output 64 of the flash evaporator 62, is a brine water further concentrated to outlet concentration of TDS greater than the inlet concentration. The pump 56 elevates the waste water pressure from approximately 5 psia at its input to approximately 150 psia. The temperature is also raised so that the input waste water to the flash evaporator 62 is at 150 psia and 358° F.

Likewise, in FIG. 4 showing Stage #3 of the overall example system, its input 64 from the output of Stage #2 is processed through a pump 66, condenser 68, preheater 70, and flash evaporator 72. The output 74 of the flash evaporator 72 is a further concentrated to outlet concentration of TDS greater than the inlet concentration. The pump 66 elevates the waste water pressure from approximately 5 psia at its input to approximately 150 psia. The temperature is also raised so that the input waste water to the flash evaporator 72 is at 150 psia and 358° F.

The inputs and outputs of the individual stages can all be at 1 atm or at pressure identified in the examples indicated above or at a pressure chosen by the process operator to optimize energy utilization within the process. Advantage can be taken within each stage to pressurize the inputs to the respective flash evaporators 50, 62, and 72 to a higher pressure ranging from 2 to 40 times the lower inlet pressure. In this example, that can result in a temperature of above 300° F. for quicker, more efficient separation and concentration in the respective flash evaporator.

The results from any of FIGS. 2-4 yield brine of lower outlet flow rate than the inlet flow rate along with higher concentration of TDS than the inlet concentration.

That reduction in mass of the three stages (about 60%-80% less than the original input) is significant and meritorious for economical and effective treatment.

Figure 5:
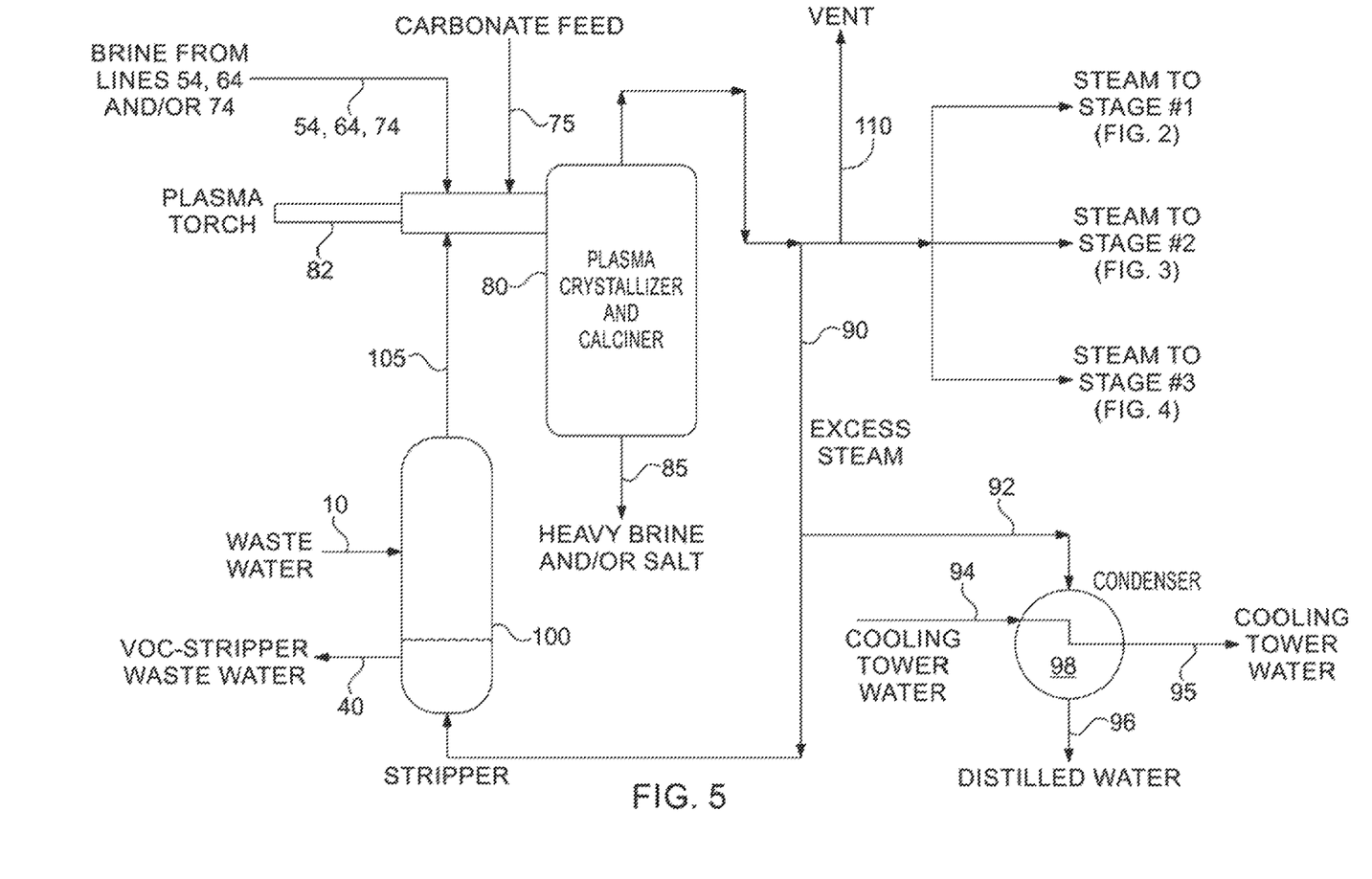
FIG. 5 is a schematic flow diagram of an example thermal reactor for use in a water treatment system in conjunction with elements such as those of FIGS. 2-4.

Examples of an additional aspect of the present invention will be presented with reference to FIG. 5.

FIG. 5 represents an example of applying the output brine water (line 64) of the Stage #3 treatment (FIG. 4) to a "Plasma Crystallizer/Calciner" 80. The plasma crystallizer/calciner 80 is an example of a known pyrolytic reactor that can be used to finish separation of water from salts dissolved in it. It is also an example of known pyrolytic calcining reactor (calciner) wherein carbonates, e.g., calcium carbonate ($CaCO_3$), magnesium carbonate ($MgCO_3$), etc. are fed via conduit 75 and are calcined to produce oxides, e.g., calcium oxide (CaO), magnesium oxide (MgO), respectively, etc. The involved chemical reactions are as following:

$$CaCO_3 \rightarrow CaO + CO_2$$

$$MgCO_3 \rightarrow MgO + CO_2$$

The carbonates are fed in front of the plasma torch 82 such that they intensely mix with the high temperature gases exiting from the plasma torch. The carbonates are substantially converted to carbon dioxide and oxides. The oxides react in the plasma crystallizer/calcining reactor to produce chlorides, e.g., calcium chloride ($CaCl_2$), magnesium chloride ($MgCl_2$), respectively, etc. The involved chemical reactions are as following:

$$CaO + 2NaCl + H_2O \rightarrow CaCl_2 + 2NaOH$$

$$MgO + 2NaCl + H_2O \rightarrow MgCl_2 + 2NaOH$$

Such chlorides dissolve in the concentrated brine, thereby increase the density of the brine and result in the production of heavy brines. Such heavy brines can be further treated by conventional system to adjust the pH as required for sale of the heavy brine. Other thermal reactors may also be used. The example of a plasma reactor, which can be consistent with known plasma gasification/vitrification reactors, which are operated with one or more plasma torches 82 as is well known in published literature, are believed to provide opportunity for a favorable cost-benefit ratio.

In general, for multistage operation, the plasma crystallizer/calciner is utilized at the final stage when the output brine has been concentrated to the desired level, as described in the above example. It can also be suitable to have a multistage system not only for salts concentrating (as in FIGS. 2-4) but also a separation subsystem after any individual one of the early concentration stages (e.g., after either, or both, stages #1 and #2). However, it is generally more cost effective to have a single separation subsystem after the last of some number of concentration stages.

In general, any thermal reactor may be used to separate the salts and the water. A reactor operated to produce disposable salts (referred to herein as a "crystallizer/calciner") is generally suitable. Where the salts have toxicity, it may be desirable to operate the reactor in a manner so they are vitrified. Any reference to a crystallizer/calciner herein can also include a vitrifier.

FIG. 5 shows how steam from the crystallizer/calciner 80 can be redirected back to the respective earlier stages of FIGS. 2-4. Also, it shows excess steam in conduit 90 which is used in a stripper 100 which is utilized to remove volatile organic compounds (VOCs) from the wastewater. Additional amount of excess steam via conduit 92 may be used in condenser 98 to produce distilled water shown in conduit 96. Excess steam may also be used for other purposes.

Before treatment in the stages shown in FIGS. 2-4, the wastewater 10 is first, in this example, sent to the stripper 100 where the steam is used to remove VOCs from the wastewater. The stripped wastewater 40 is sent as feed to the pump 42 in Stage #1 of FIG. 2. The VOCs which are removed from the wastewater exit the stripper 100 through a conduit 105 which connects to the plasma crystallizer/calciner 80. The VOCs are fed in front of the plasma torch 82 such that they intensely mix with the high temperature gases exiting from the plasma torch. The VOCs are substantially converted to carbon dioxide and steam. The heat generated by this conversion of VOCs to carbon dioxide and steam is utilized in the plasma crystallizer/calciner, along with the heat supplied through the plasma torch, to vaporize the water from the brine 74. This reduces the amount of heat and the corresponding amount of electricity utilized in the plasma torch of the crystallizer/calciner.

The steam exiting the plasma crystallizer/calciner 80 is periodically vented via conduit 110. This keeps the levels of non-condensible gases low enough such that they do not degrade the performance of the heat exchangers used in the process.

It is therefore seen that systems and processes in accordance with the present invention can make use of known and available components, such as flash evaporators for concentration of salts and plasma gasifier reactors for crystallization (or vitrification) of the salts, in particular innovative ways with insight as to both the capital cost and the operating cost. A need for such cost-effective water treatment has been heightened by practices such as the use of large amounts of water in natural gas drilling.

In general summary, but without limitation, the present invention can be characterized in the following ways, for example:

A system, and a corresponding method, in which wastewater is supplied to one or more stages of equipment including a pump for pressurizing the water, a heater that heats the pressurized water well above normal boiling temperature, a flash evaporator, or other device, that receives the heated, pressurized water and results in fluid evaporation and concentration of solids that were in the wastewater, and, for instances in which the brine water with concentrated solids cannot be otherwise readily and safely disposed of, a thermal or pyrolytic reactor to crystallize or otherwise yield a form of the solids that can be readily and safely disposed of, such a reactor may also be applied as a heater for the original incoming wastewater. Also, or alternatively, such a reactor may be used to form a vitrified glass of the salts. Also, or alternatively, such a reactor may be used to produce heavy brines by addition of carbonates to such systems and producing chlorides.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

What is claimed is:

1. A system for treating wastewater, comprising:
an initial preheater configured to receive wastewater;
a heat exchanger configured to receive wastewater from the preheater and supply steam to the preheater;
a plasma recovery system (PRS) configured to receive wastewater from the heat exchanger and provide steam to the heat exchanger;
wherein:
the wastewater comprises water, salt, and volatile organic compounds;
the preheater transfers heat from the steam to the wastewater, converting the steam to distilled water;
the heat exchanger transfers heat from the steam to the wastewater before transferring the steam to the preheater; and
the PRS is configured to: volatize water from the wastewater to generate steam;
and separate salt from the wastewater to generate a brine;
at least one processing stage configured to increase a concentration of the salt in the brine to form a concentrated brine; and
at least one plasma crystallizer/calciner comprising a pyrolytic calcining reactor receiving the concentrated brine and generating chlorides that mix with the concentrated brine,
wherein the pyrolytic calcining reactor is configured to generate excess steam and direct the excess steam to a condenser in operative connection with the pyrolytic calcining reactor, the condenser configured to convert the excess steam to distilled water.

2. The system recited in claim 1, wherein the at least one processing stage comprises a plurality of processing stages, the plurality of processing stages comprising a first processing stage, a second processing stage, and a third processing stage, wherein:
the first processing stage comprises: a first stage pump, a first stage condenser, a first stage preheater, and a first stage evaporator, the first processing stage being configured to receive the brine and produce a first brine water, the brine being at an initial pressure, an initial temperature, and having an initial concentration of salt, the first brine water having a first pressure greater than the initial pressure, a first temperature greater than the initial temperature, and a first concentration of salt greater than the initial concentration of salt, the first stage evaporator being configured to generate steam from the brine and direct the steam to the first stage preheater;
the second processing stage comprises: a second stage pump, a second stage condenser, a second stage preheater, and a second stage evaporator, the second processing stage being configured to receive the first brine water and produce a second brine water having a second pressure greater than the first pressure, a second temperature greater than the first temperature, and a second concentration of salt greater than the first concentration of salt, the second stage evaporator being configured to generate steam from the first brine water and direct the steam to the second stage preheater, and
the third processing stage comprises: a third stage pump, a third stage condenser, a third stage preheater, and a third stage evaporator, the third processing stage being configured to receive the second brine water and produce a third brine water having a third pressure greater than the second pressure, a third temperature greater than the second temperature, and a third concentration of salt greater than the second concentration of salt, the third stage evaporator being configured to generate steam from the second brine water and direct the steam to the third stage preheater.

3. The system recited in claim 2, wherein:
the pyrolytic calcining reactor comprises first through third pyrolytic calcining reactors provided one each after the first through third processing stages, respectively, and wherein:
the first pyrolytic calcining reactor is configured to receive the first brine water and separate water from the first brine water;
the second pyrolytic calcining reactor is configured to receive the second brine water and separate water from the second brine water; and
the third pyrolytic calcining reactor is configured to receive the third brine water and separate water from the third brine water.

4. The system recited in claim 3, wherein:
the first pyrolytic calcining reactor is configured to generate excess steam and direct the excess steam to the first processing stage;
the second first pyrolytic calcining reactor is configured to generate excess steam and direct the excess steam to the second processing stage; and
the third first pyrolytic calcining reactor is configured to generate excess steam and direct the excess steam to the third processing stage.

5. The system recited in claim 1, wherein the pyrolytic calcining reactor comprises a vitrifier.

6. The system recited in claim 1, wherein the pyrolytic calcining reactor is configured to generate excess steam and direct the excess steam to the at least one processing stage.

7. The system recited in claim 1, further comprising a stripper in operative connection with the pyrolytic calcining reactor, wherein:
the stripper is configured to remove the volatile organic compounds from the concentrated brine; and
the pyrolytic calcining reactor is configured to generate excess steam and direct the excess steam to the stripper.

8. The system recited in claim 1, further comprising a stripper in operative connection with the PRS, the stripper configured to remove the volatile organic compounds from the brine.

9. The system recited in claim 8, wherein:
the pyrolytic calcining reactor comprises a plasma torch;
the stripper is configured to transfer the volatile organic compounds to the plasma torch to convert the volatile organic compounds to heat.

10. A system for treating wastewater, comprising:
an initial preheater configured to receive wastewater;
a heat exchanger configured to receive wastewater from the preheater and supply steam to the preheater;
a plasma recovery system (PRS) configured to receive wastewater from the heat exchanger and provide steam to the heat exchanger;
wherein:
the wastewater comprises water, salt, and volatile organic compounds;
the preheater transfers heat from the steam to the wastewater, converting the steam to distilled water;
the heat exchanger transfers heat from the steam to the wastewater before transferring the steam to the preheater; and
the PRS is configured to: volatize water from the wastewater to generate steam; and separate salt from the wastewater to generate a brine;

at least one processing stage configured to increase a concentration of the salt in the brine to form a concentrated brine;

a pyrolytic calcining reactor receiving the concentrated brine and generating chlorides that mix with the concentrated brine; and a stripper in operative connection with the pyrolytic calcining reactor; and a condenser in operative connection with the pyrolytic calcining reactor, wherein the pyrolytic calcining reactor is configured to generate excess steam and direct the excess steam to each of:

the at least one processing stage;

the stripper; and the condenser.

11. A method for treating wastewater, comprising:

receiving wastewater at a preheater, the wastewater comprising water, salt, and volatile organic compounds;

transferring the wastewater from the preheater to a heat exchanger;

transferring steam from the heat exchanger to the preheater, the preheater transferring heat from the steam to the wastewater;

transferring the wastewater from the heat exchanger to a plasma recovery system (PRS) to generate steam and a brine;

transferring steam from the PRS to the heat exchanger, the heat exchanger transferring heat from the steam to the wastewater;

transferring the wastewater from the PRS to at least one processing stage, increasing a concentration of salt in the brine to form a concentrated brine; and transferring the concentrated brine to a pyrolytic calcining reactor, generating in-situ chlorides that mix with the concentrated brine.

12. The method recited in claim 11, wherein the at least one processing stage comprises a plurality of processing stages, the plurality of processing stages comprising a first processing stage, a second processing stage, and a third processing stage.

13. The method recited in claim 11, wherein:

the at least one processing stage comprises at least one of a first processing stage, a second processing stage, and a third processing stage; and the brine is selectively directed to at least one of the first processing stage, the second processing stage, and the third processing stage.

14. The method recited in claim 13, wherein:

the brine within the first processing stage is a pressure within a range from 14.7 psia to 150 psia and at a temperature of 358° F.;

the brine within the second processing stage is at a pressure within a range from 5 psia to 150 psia and at a temperature of 3580° F.; and the brine within the third processing stage is at a pressure within a range from 5 psia to 150 psia and at a temperature of 358° F.

* * * * *